March 4, 1952

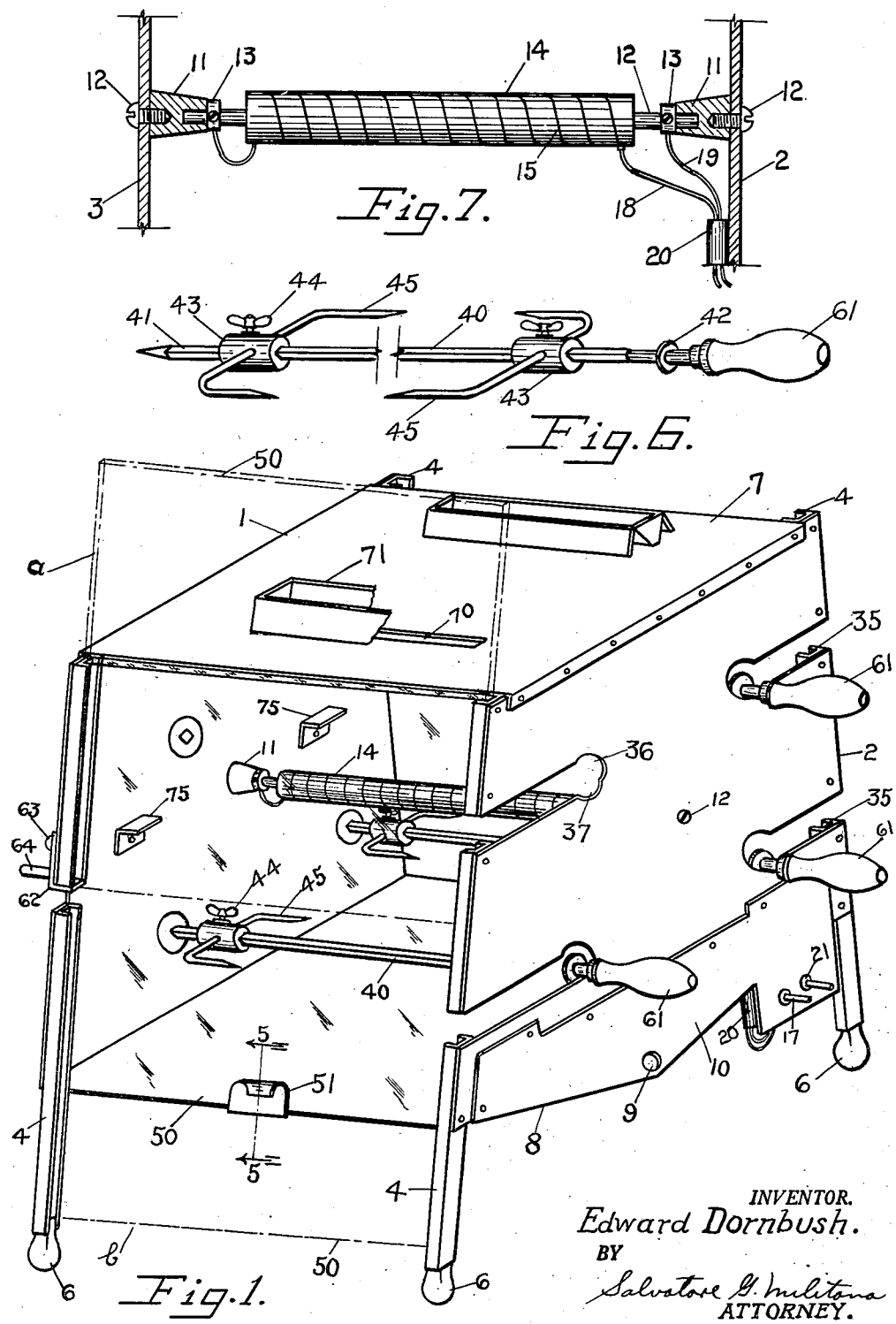

E. DORNBUSH 2,588,091

COMBINATION ROTISSERIE AND OVEN

Filed Jan. 13, 1950

INVENTOR.
Edward Dornbush.
BY
Salvatore G. Militana
ATTORNEY.

Patented Mar. 4, 1952

2,588,091

UNITED STATES PATENT OFFICE 2,588,091

COMBINATION ROTISSERIE AND OVEN

Edward Dornbush, Miami Beach, Fla.

Application January 13, 1950, Serial No. 138,308

1 Claim. (Cl. 99—421)

This invention relates to barbecue chicken and meat roasters and is more particularly directed to a combination baking and roasting device which is completely electrically operated.

An important object of the present invention is to provide a completely electrically operated roasting device which is simple yet rugged in construction and efficient in operation.

A further object of the present invention is to provide a device of the character described with four rotatable spits symmetrically disposed about a substantially centrally positioned electrical resistance heating coil.

A still further object of the present invention is to provide a rotisserie oven with spits which are readily and easily removed, and with a basting trough mounted directly above each pair of spits so as to permit continuous basting all thru the roasting process.

A still further object of the present invention is to provide a device which can be readily converted from a rotisserie capable of roasting four items of food simultaneously to a device capable of roasting two such items on the lower spits while baking food in the upper portion, or bake food in the upper portion, while broiling food in the lower portion of the device.

With these and other objects in view the invention will be best understood from a consideration of the following detailed description taken in connection with the accompanying drawings, forming a part of the present specification with the understanding, however, that the invention is not confined to any strict conformity with the showing of the drawing, but may be changed or modified so long as such changes or modifications mark no material departure from the salient features of the invention as expressed in the appended claim.

In the drawings:

Figure 1 is a perspective view in elevation with parts broken away of my invention.

Figure 6 is a perspective view of a spit or skewer combination.

Figure 7 is a fragmentary view partly in section of the heating device.

Figure 3:
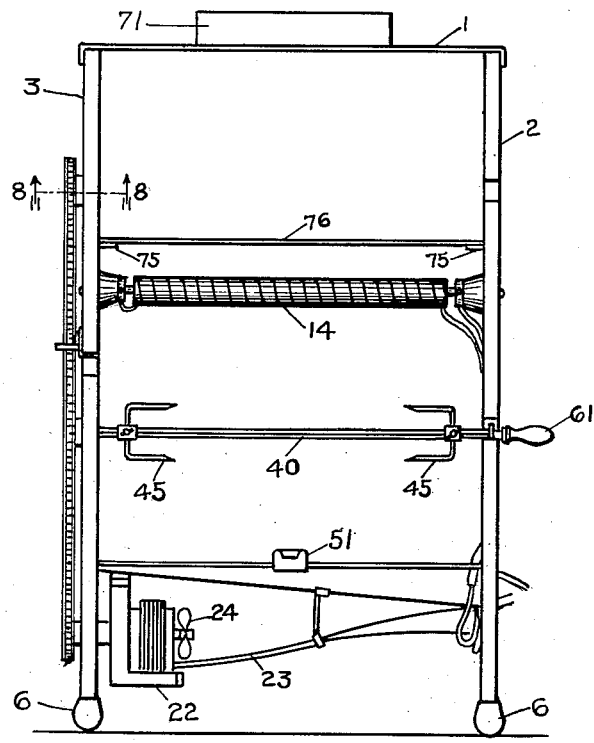
Figure 3 is a front elevational view with the upper portion of the rotisserie converted to permit baking.
Figure 4:
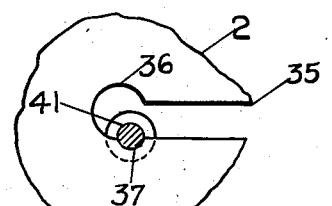
Figure 4 is a fragmentary view of a portion of the slotted side wall of the device showing the particular construction thereof.
Figure 2:
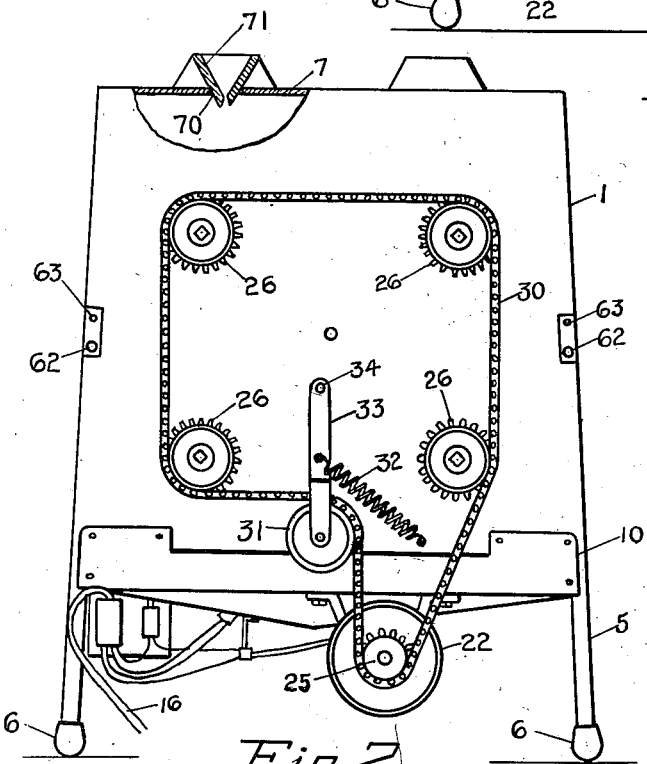
Figure 2 is a side elevational view showing the sprocket and chain assembly.

Referring now to the drawings and more particularly to Figures 1-3 inclusive, wherein like numerals of reference indicate corresponding parts throughout the several views, the numeral 1 indicates generally the rotisserie consisting of the side walls or plates 2 and 3 having inclined end portions to which are secured U-shaped channel members 4 either by rivets as shown or by any well known method for securing metals such as iron, aluminum and the like. The lower portions of the channel members 4 form legs or supports for the rotisserie, on the lower ends of which are mounted rubber pads 6, 6 to prevent scratching the surface upon which the device is placed. Across the top portion of the side walls 2 and 3 and secured thereto, extends a cover plate 7 made of sheet metal. The bottom wall of the device consists of a casting 8 having an inclined surface towards the mid portion thereof, so as to cause a pronouced drain towards a drain opening 9, with a pair of up-extending flanges 10, 10 which are secured to the bottom portions of the side walls 2 and 3.

Within the rotisserie 1 and slightly below a central position of the oven on each of the side walls 2, 3 there is secured a ceramic mounting 11 by means of a screw 12 (see Figure 7). A combination support bar and conductor 12 is fitted into bores extending part way into the mountings 11, 11. At each end of the bar 12 there is mounted a terminal post 13 with a set screw, and between the posts 13 there is an elongated ceramic cylinder 14 upon which is wound a heating element or resistance wire 15. A switch 17 which controls the flow of the current to the heating element 15 is connected to the wires 18, 19 extending through a protective shield 20 positioned adjacent the inside surface of the side wall 2. The wire 18 is connected to one end of the heating coil 15 while the other wire 19 is connected to one of the terminal posts 13, the other post 13 being connected to the free end of the heating coil thus completing the electrical circuit.

A second switch 21 mounted on an extension to the flange 10 (see Figure 1) in close proximity to the switch 17, is connected to a double shaft motor 22 by means of a pair of wires 23, 23. The motor 22 is mounted on the lower surface of the casting 8 adjacent the side wall 3. Mounted on the shafts of the motor 22 are a fan 24 for ventilating purposes and a power drive wheel 25 positioned beyond the side wall 3. (See Figure 3.) A wire 16 which extends to a source of power (not shown) is connected to the two switches 17, 21 so as to convey power to the motor 22 and heating coils 15 when desired.

Figure 8:
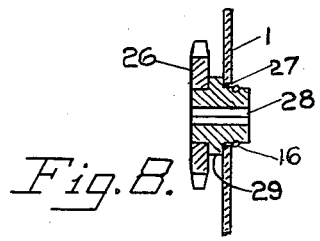
Figure 8 is a section taken through 8—8 in Figure 3.

Spaced symmetrically about the heating coil 15 are four sprocket wheels 26 (see Figures 2 and 8) each of which is secured to a stub shaft 28 revolvably mounted on a bushing 27 in the side wall 3. The shafts 28 have a spacer element mounted thereon outside the side wall 3, and a split ring 16 seated in a groove on the shaft 28 on the inside of the side wall 3. The shafts 28 are provided with bores having a rectangular cross section adapted to receive the pointed end of a spit 40. The sprocket wheels 26 form two groups, an upper group and a lower group. The lower group is positioned slightly closer to the heating coil 15 than the upper group thereof. (See Fig. 2.) Since heat has a tendency to rise, it has been found that the heat emitted toward and received at the lower group can be equalized to that received at the upper group by placing the former group slightly closer to the heat source. In this manner, when articles of food are placed simultaneously in position along the axes of the sprocket wheels, as explained in greater detail hereinafter, the food will become cooked or roasted equally at approximately the same time.

An endless sprocket chain 30 extends about the drive wheel 25 and each of the four sprocket wheels 26. An idler wheel 31 revolvably mounted on an arm 33 is tensioned against the sprocket chain 30 by means of a spring 32, one end of which is secured to the side wall 3 and the other end to the arm 33. The arm 33 is pivoted at 34 to the side wall 3.

On the side wall 2 in horizontal alignment with each of the four stub shafts 28 there is a slot 35. The slots 35 extend horizontally from the end of the side wall 2 to a position diametrically opposed to the shafts 28. At the inner ends of the slots 35 are an enlarged opening or bore 36 positioned in the upper portion of the slot 35 and a smaller curved surface in the lower portion 37 thereof, to receive the spit 40 and thereby prevent an unintentional slipping therefrom.

Each of the spits 40 (see Figures 1 and 6) consists of a pointed skewer 41 having a rectangular cross section, with a handle 61 mounted on one end thereof. Adjacent the handle 61 the skewer 41 is cylindrical so as to rest in the curved surface 37 at the inner end of the slot 35 when the split 40 is in its operating position. A stop member 42 is welded or otherwise secured to the skewer 41 adjacent to the cylindrical portion thereof, and abuts against the inner surface of the side wall 2 thus preventing lateral movement of the spit 40, and the pointed end of the skewer from unintentionally leaving the bore in the stub shaft 28 of the sprocket wheel 26. The stop 42 is of larger diameter than that of the bore 36 to compel an operator of the device to remove the spit 40 by sliding it along the slot 35 towards the end of the side wall 2 and beyond the channel 4.

On each end of the skewers 41 a spindle 43 is slidably, but non-rotatably mounted. Carried by each of the spindles are a wing bolt 44 for securing the spindles 43 in position, and a U-shaped wire barb 45 having its pointed ends or prongs substantially in alignment with the skewer 41 and directed towards the middle of the rotisserie.

Figure 5:
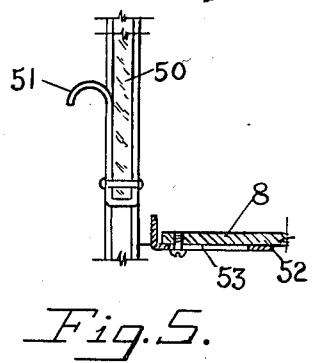
Figure 5 is a fragmentary section taken along 5—5 of Figure 1.

On the front and rear of the rotisserie are a pair of Pyrex glass windows 50 slidably mounted within the channel members 4, 4. A finger grip 51 (see Figures 1 and 5) is secured by a bolt or otherwise to the lowermost portion of the window 50. A stop or catch 52 is slidably secured to the underside of the casting 8 by a bolt extending thru an elongated slot 53 in the catch 52 to permit the latter to be pulled out to its extended position to support the window 50 in its closed position. The catch 52 may be pushed into its retracted position to permit the window 50 to slide down past it to its lower position indicated as b in Figure 1. In this last named position, the upper portion of the rotisserie is accessible and the upper spit 40 can be removed or replaced as the case may be. In order to permit access to the lower portion of the oven, the windows 50 are each maintained in their upper position indicated as a in Figure 1 by an L-shaped latch 62 pivoted at 63. The channel member 4 is slotted to permit the free end of the latch 62 to be pivoted into the path of the glass window 50 by means of a handle 64 secured to the stop 62, and consequently maintain the window 50 in its elevated position.

In order to permit the basting of food during the roasting process, the cover plate 7 is provided with a pair of elongated slot openings 70 (see Figures 1 and 2) cut therein, each of which is aligned with and directly above each pair of spits 40. A basting trough 71 removably placed in each of the slots 70 are V-shaped in cross section with an opening extending throughout the full length of the trough to permit the free flow of basting fluid therethrough.

As shown by Figure 3, the rotisserie may be converted to bake foods in the upper portion thereof. On the side walls 2 and 3 of the rotisserie there are angle brackets 75 secured thereto. Upon these brackets 75 rests an oven platform 76 which may be removed with ease. If it is desired to broil food, the pair of lower spits 40 are revolved until the wire barbs 45 are horizontally disposed. Upon these spits, as a support, a broiler pan or a steak grill (not shown) or the like may be placed with the meat or other food to be broiled placed thereon.

The operation of the present invention is now fully apparent. For example, in order to roast four items of food such as chickens, etc., one of the glass windows 50 is slid up to its upper position, the latch 62 swinging to its hold position. The lower spit 40 is removed and a chicken skewed thereon, the wire barbs 45 being adjusted along the skewer 41 to accommodate the particular sized chicken. The spit 40 is then replaced and the glass window 50 lowered to the lowermost position, the latch 52 having been pushed into its retracted position out of the path of the glass window; now, the upper spit 40 is removed and a chicken placed thereon. The glass window is then raised beyond the latch 52. The latch 52 is pulled out to its extended position and the glass window is permitted to drop thereon which then holds the window in its closed position. This procedure is now repeated on the other side of the rotisserie whereby chickens are placed on the other two spits 40. Switches 17 and 21 are then set to permit the flow of electricity to the heating coil 15 and the motor 22. As the chickens revolve with the spits and are being cooked simultaneously, the grease from the chickens on the upper spits drips on the chickens of the lower spits, and the grease from the lower chickens drips onto the casting 8, and flow to the opening 9 and into a suitable container. This basting fluid is then poured into the basting troughs 71, 71; the openings therein permitting the liquid to drip slowly onto the chickens on the upper spits 40, all of the chickens cooking at an equal rate since the upper group thereof is slightly farther from the heating coil 15 than the lower group, and each of them being cooked evenly throughout.

Having now disclosed an embodiment of my invention and realizing that, in view of my disclosure many modifications in details of construction or design will readily occur to those skilled in the art I do not choose to limit myself except as in the appended claim.

I claim:

A device of the class described comprising an oven having side walls, a top wall mounted on said side walls, a heating element capable of emitting heat in all directions about said element and substantially centrally positioned in said oven with its end portions secured to said side walls, a plurality of stub shafts rotatably mounted on said first side wall and extending therethrough, said stub shafts being substantially symmetrically disposed about said heating element and comprising one group mounted above said heating element, and one group mounted below said heating element with each of said stub shafts of said upper group mounted in substantially vertical alignment with a stub shaft of said lower group whereby substantially equal quantities of heat are received at the horizontal axes of said stub shafts, a noncircular cross sectioned bore at the axes of each of said stub shafts adapted to receive a skewer, a recess in said second side wall directly opposed to each of said stub shafts, a slot in said second side wall extending from the outer edges thereof to each of said recesses, a sprocket wheel secured to each of said stub shafts on the outside of said first side wall, a sprocket chain engaging each of said sprocket wheels, power means operatively connected to said sprocket chain whereby each of said sprocket wheels are rotated, a plurality of skewers, each skewer comprising an elongated shaft resting in said recess, a pointed portion at one end of each of said elongated shafts received by said bore of said stub shaft, a handle mounted on said elongated shaft at the outside of said second side wall, a plurality of elongated slots contained by said top wall in alignment with said skewers, and an elongated basting trough having an open bottom along its full length mounted in each of said elongated slots on said top wall.

EDWARD DORNBUSH.

REFERENCES CITED

The following references are of record in the file of this patent:

UNITED STATES PATENTS

| Number | Name | Date |
|---|---|---|
| 1,465,061 | Schey | Aug. 14, 1923 |
| 1,740,729 | Garvis | Dec. 24, 1929 |
| 1,790,488 | Saunders et al. | Jan. 27, 1931 |
| 1,888,616 | Bocchino | Nov. 22, 1932 |
| 2,012,702 | Zolotas | Aug. 27, 1935 |
| 2,012,811 | Duffy | Aug. 27, 1935 |
| 2,127,658 | Walterspiel | Aug. 23, 1938 |
| 2,182,225 | Garvis | Dec. 5, 1939 |
| 2,307,914 | Bitney | Jan. 12, 1943 |
| 2,494,448 | Nassif | Jan. 10, 1950 |
| 2,499,558 | Andrews | Mar. 7, 1950 |
| 2,505,976 | Leon | May 2, 1950 |
| 2,511,594 | Loffredo | June 12, 1950 |
| 2,512,223 | Contiguglia | June 20, 1950 |
| 2,517,360 | Singer | Aug. 1, 1950 |

FOREIGN PATENTS

| Number | Country | Date |
|---|---|---|
| 26,502 | Austria | Nov. 26, 1906 |
| 167,890 | Germany | Mar. 18, 1905 |